Jan. 30, 1940.　　　　G. P. HAYNES　　　2,188,391
BLOW-OFF VALVE
Filed June 6, 1936
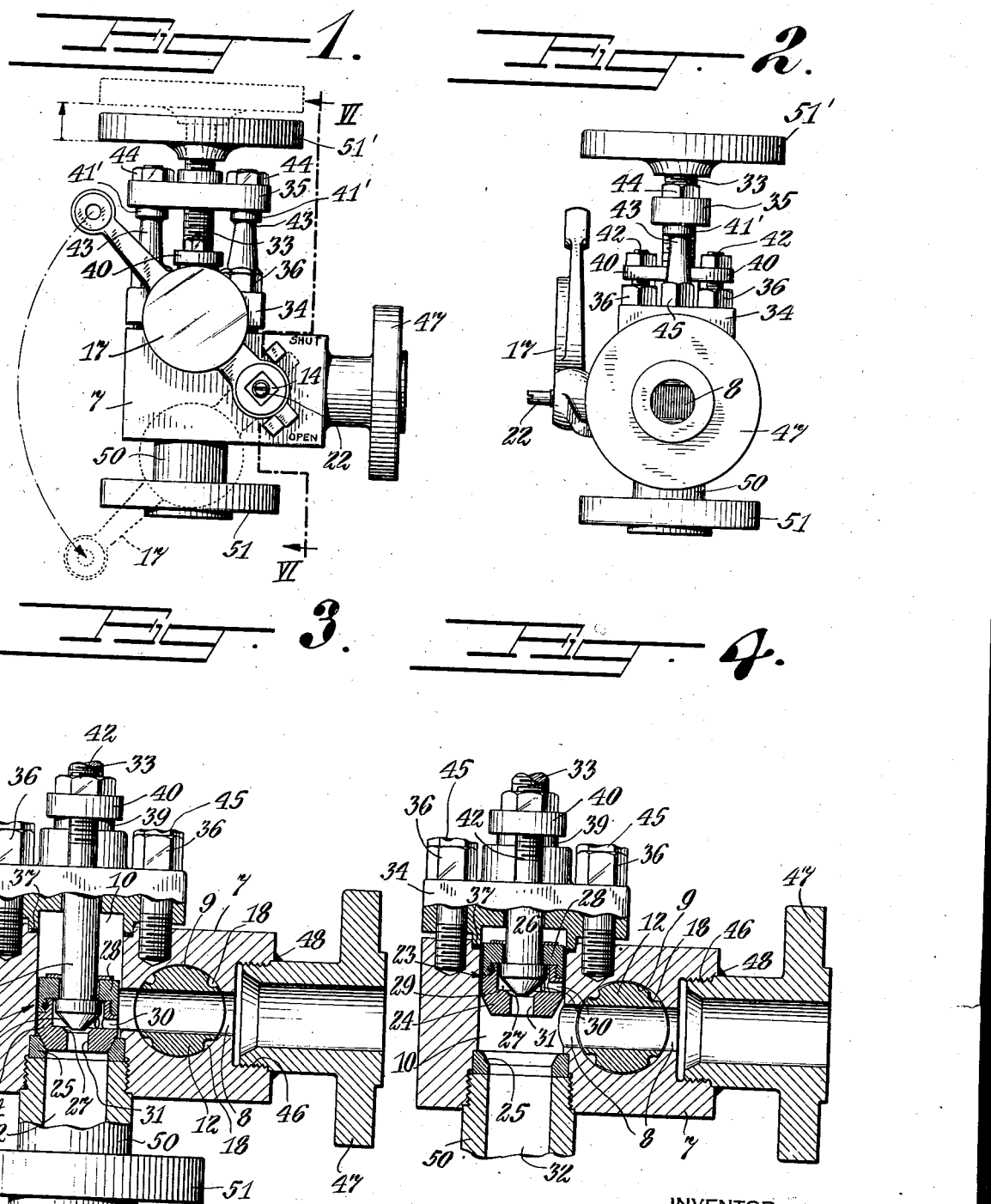
INVENTOR
G. P. HAYNES
BY
ATTORNEY Patented Jan. 30, 1940

2,188,391

UNITED STATES PATENT OFFICE 2,188,391

BLOW-OFF VALVE

George P. Haynes, East Rockaway, N. Y.

Application June 6, 1936, Serial No. 83,856

3 Claims. (Cl. 277—37)

This invention relates to valves and more particularly to such valves known as "blow-off" valves for high pressure boilers and the like.

The provision of satisfactorily operating valves to blow a boiler down, for example, has long been a problem. Many efforts in the past have been directed to the simplification of such valves and to provide a valve which will give satisfactory service over long periods of time.

Because of the danger attendant the clogging of the valve by scale, sediment, etc., regulations require that such valves be designed to embody two valves so that in the event one of the valves should clog and remain unseated, protection to the boiler can be had by closing another valve.

Blow-off valves as now designed and employed commercially do not permit the blowing down of a boiler, for example, in a gradual flow manner. Obviously to suddenly start or stop the flow of a column of water one and a half or two inches in diameter with a differential pressure of from 200 to 400 pounds sets up undesirable strains and becomes a real and dangerous hazard in handling solid water. To overcome these difficulties and dangers the valve of the present invention is so designed as to start the discharge slowly by employing an auxiliary valve and subsequently thereto to operate the main discharge valve. The strain on the main valve is thus relieved through the establishment of back-pressure on the discharge side of the valve and at the same time the thrust and wear on the valve screw stem is materially reduced.

As a result of such construction the valve may be materially reduced in size and weight over the tandem blow-off valves now in service. In addition the valve of the present invention is so designed as to permit partial discharge of the boiler at frequent intervals without disturbing or unseating the main valve.

As explained above, regulations require a tandem valve design for blow-off valves in order to assure the necessary safety and obviate the danger of explosions. Valves as heretofore designed for this purpose were rather cumbersome and were not adapted to many places where space was limited. In order to overcome this difficulty the valve of my invention has been designed to provide a minimum of space, this being accomplished through the employment of a rotary shut-off valve which requires no movement along its longitudinal axis.

By reason of such construction the size of the valve assembly is considerably diminished without depreciating from its ruggedness even for the most drastic conditions of service. A further advantage resulting from this novel combination is the ability to machine from a single rectangular block of steel the two valve chambers. The further advantage resulting from such design is the elimination of intermediate flanges and the provision of a clear flow passage of the fluid with no intervening pockets in which scale can lodge.

Therefore, it is an object of my invention to provide a tandem blow-off valve rugged in character and compact in design.

A further object of my invention is to cheapen the cost of manufacture of tandem blow-off valves through the combination of a novel rotary valve with a reciprocating valve.

A still further object is to provide a novel form of rotary valve in which the tightness of the valve is maintained by a plastic metallic packing having lubricating properties.

Another object of my invention is the provision, in a tandem valve, of valve means for permitting partial blow-down of a boiler without unseating the main valve.

A further object is to provide a tandem blow-off valve having a clear passage between the valves for the passage of fluid without any intervening pockets in which scale can lodge.

Another object is to provide a valve for high pressure fluid systems which may be easily operated and in which the release of pressure is accomplished gradually.

A specific object is to provide a valve having such an arrangement of parts as to transfer screw stem strains directly to the body of the valve.

Other objects of the invention will become apparent from the following detailed specifications when read in connection with the accompanying drawing, in which Fig. 1 is a side elevational view of the entire valve;

Fig. 2 is an end elevational view of the entire valve;

Fig. 3 is a vertical sectional view of the entire valve with auxiliary valve in position for partial blow-off;

Fig. 4 is a view similar to Fig. 3 with both the main and auxiliary valves in fully open position for full blow-off.

Referring to the drawing; the valve comprising the present invention embodies a rectangular forged steel block 7 having an elliptical fluid flow passageway 8, hereinafter referred to as the inlet passage, extending from one face of the block and intersecting another larger cylindrical chamber 9 extending from another face of the block through the block to the oppositely disposed face, the longitudinal axis of the chamber 9 being at right angles to the inlet passage 8. Closely adjacent the cylindrical chamber 9 and extending from one face to another of the rectangular block is another cylindrical valve chamber 10. The longitudinal axis of the chamber 10 is at right angles to the longitudinal axis of the inlet passage 8 and the chamber 9. Such construction provides for convenience in tooling and simplicity in construction at the same time giving a rugged and compact structure which readily adapts itself to limited spaces in which the usual valves found on the market cannot be placed.

The valve chamber 9 accommodates a rotary shut-off valve 11 comprising a cylindrical valve body 12 which loosely fits the passageway but does not engage the same to be supported thereby. This body 12 is supported by trunnions 13 and 14 supported in bonnets 15 and 16, respectively, secured in any desired manner in the rectangular block 7.

The trunnion 14 is extended outwardly beyond the bonnet 16 for receiving a lever 17 to turn the rotary valve. The rotary valve body 12 is provided with a passageway which may be elliptical or of any suitable shape extending therethrough which in the one position registers with the fluid passageway 8 in another position to close said passageway.

The rotary valve body is provided with four longitudinal slots 18 on its surface which extend from end to end of said body. These slots communicate with an annular opening 19 partly formed in the rectangular block and by reduction of a portion of the valve body and in this reduced portion of the rotary valve body are radial conduits 20 communicating with a packing storage chamber 21 in the trunnion 14. Threaded in the packing chamber 21 is a forcing screw 22. The purpose of these slots, conduits and chambers is to provide a space for a metallic lubricating packing for the rotary valve, the packing being forced in by means of the forcing screw. The rotary valve through this arrangement floats on this packing which makes a fluid tight seal with the main body of the valve free, thus enabling one to more easily turn the rotary valve and to avoid wear on rotary valve body 12. For the sake of convenience the rotary valve will be referred to hereinafter as the shut-off valve.

The discharge or screw down valve is mounted in the valve chamber 10 and comprises a duplex valve assembly 23 consisting of a main valve 24 and its seat 25 and an auxiliary conically shaped valve 26 and its seat 27, the latter forming a part of the valve 24. The main valve comprises a cylindrical block threaded into a cylindrical cage 28. The cylindrical block has a chamber 29 in which the auxiliary valve 26 has sufficient movement to be entirely disengaged from its seat 27.

Communication with the fluid passageway 8 from the chamber 29 is provided by means of several radial openings 30 whereby fluid may flow from the passageway 8 into the chamber 29. An opening 31 is disposed in the valve seat to communicate with the discharge passageway 32. Disposed within the chamber 29 is auxiliary valve 26 which latter is mounted on the end of a screw stem 33 extending outwardly through the valve chamber 10 beyond the rectangular block and through a cover flange 34 and yoke 35 which latter threadedly engages the screw stem 33. It should be noted that the conical end of the auxiliary valve 26 is in the pressure stream from the openings 31 and consequently the velocity head supplements the force tending to open the valve instead of opposing that force. The cover flange 34 is bolted to the rectangular block by bolts 36 and disposed between the cover flange and rectangular block is a gasket 37 to hermetically seal the joint.

The cover flange is bored out at 38 to receive a gland 39 having outwardly extending arms 40 to force the packing 41 against the cover flange and screw stem 33 to prevent leakage. Bolts 42 passing through the arms 40 and engaging the cover flange 34 are employed to force the gland against the packing 41.

The yoke 35 is directly supported from the rectangular block 7 by collars 41' on bolts 43 which latter pass through holes in the cover flange 34 and are threaded at their ends in the rectangular block 7. Nuts 44 are provided to secure the yoke 35 against the collars 41' and hexagon portions 45 are integral with the bolts 43 to screw the bolts into the block 7. This construction relieves the cover flange from any strains caused by closing the discharge valves and transfers such strains directly to the rectangular block 7, thus preventing any release of pressure on the gasket 37 and permitting the bolts 36 to be much smaller than were these strains transmitted to the cover flange.

The blow-off valve as thus far described may be manufactured as a standard unit and as thus designed is adapted for coupling to various pipe lines. This latter may be accomplished by the provision of an enlarged threaded recess 46 in the upstream end of the fluid flow passage 8 to receive a flanged coupling member 47 which may be varied in size as desired and then subsequently welded at 48 to the rectangular block 7.

The discharge end of the valve chamber 10 is provided with a slightly larger threaded opening 49 to receive a coupling 50 having a swivel flange 51. These flanges may be of varying sizes and provided with openings for bolting to various sized pipes.

By swivelling this flange the coupling may be readily made regardless of the position of the bolt openings in the flange on the connecting pipe. This coupling 50 additionally serves to lock the valve seat 25 firmly in position. By removing the coupling 50 the valve seat may be removed for regrinding or renewal.

A handwheel 51' is secured to the screw stem 33 for operating the discharge valves.

Having thus described a specific embodiment of the invention, what I claim as new and desire to secure by Letters Patent of the United States is:

1. A blow-off valve comprising a unit housing having a valve chamber, an inlet passageway entering the housing from one side thereof and opening into said valve chamber, an outlet passageway exposed to atmospheric pressure leading from said valve chamber and out another side of said housing at an angle to said inlet passageway, a valve assembly disposed in said valve chamber and normally closing said outlet passageway comprising a main valve provided with a seat for establishing direct communication between said inlet and outlet passageways and an auxiliary valve cooperating with said main valve, said main valve having a passageway therethrough for the flow of pressure fluid and a valve seat against which said auxiliary valve seats, said auxiliary valve establishing direct communication between said inlet and outlet passageways independent of said main valve upon being moved from its seat and means exposing said auxiliary valve to the pressure in said inlet passageway to cause the velocity head of the medium under pressure to assist in the opening movement of said auxiliary valve.

2. A blow-off valve comprising a unit housing having a valve chamber, an inlet passageway entering the housing from one side and opening into said valve chamber at an angle thereto, an outlet passageway leading from said valve chamber in a longitudinal direction with respect thereto, a reciprocating valve assembly disposed in said valve chamber and normally closing said outlet passageway comprising a main valve provided with a seat and operative to establish direct communication between said inlet and outlet passageways and an auxiliary valve cooperating with said main valve, said main valve having a passageway therethrough for the flow of pressure fluid and a valve seat against which said auxiliary valve seats, means exposing said auxiliary valve to the pressure in said inlet passageway to cause the velocity head of the medium under pressure to assist in the opening movement of said auxiliary valve and means for operating said auxiliary valve to relieve the fluid pressure on said main valve and for causing a flow of pressure fluid directly from said inlet to said outlet passageway without raising said main valve from its seat.

3. A blow-off valve of the tandem type comprising a housing having a passage therethrough and a laterally disposed inlet communicating with said passage, said passage having a valve seat therein, a reciprocable valve movably mounted in said passage for coaction with said seat, said valve consisting of a hollow body having a laterally disposed port freely communicating with said inlet, and an axially disposed outlet communicating with said passage on the side towards atmospheric pressure, a stem movable relative to said body and coaxially located with respect to said outlet, said stem terminating in a conical shaped auxiliary valve to control said outlet, and a lost motion connection between said stem and body whereby the opening movement of said auxiliary valve is assisted by the velocity head of the medium under pressure and a partial or complete blow-off can be made while the hollow body valve remains closed.

GEORGE P. HAYNES.